(12) United States Patent
Cho et al.

(10) Patent No.: US 12,221,359 B2
(45) Date of Patent: Feb. 11, 2025

(54) WATER PURIFIER AND METHOD FOR CONTROLLING WATER PURIFIER

(71) Applicant: SAMSUNG ELECTRONICS CO., LTD., Suwon-si (KR)

(72) Inventors: Yeonwoo Cho, Suwon-si (KR); Jungha Park, Suwon-si (KR); Junggeun Lee, Suwon-si (KR); Wanku Kang, Suwon-si (KR); Sunghyun Kim, Suwon-si (KR); Jongho Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 444 days.

(21) Appl. No.: 17/833,029

(22) Filed: Jun. 6, 2022

(65) Prior Publication Data

US 2022/0298026 A1    Sep. 22, 2022

Related U.S. Application Data

(63) Continuation of application No. PCT/KR2020/014017, filed on Oct. 14, 2020.

(30) Foreign Application Priority Data

Dec. 13, 2019    (KR) .................. 10-2019-0166584

(51) Int. Cl.
  *C02F 1/00*        (2023.01)
  *C02F 1/32*        (2023.01)
  *C02F 1/461*       (2023.01)

(52) U.S. Cl.
  CPC .............. *C02F 1/008* (2013.01); *C02F 1/003* (2013.01); *C02F 1/32* (2013.01); *C02F 1/461* (2013.01);
  (Continued)

(58) Field of Classification Search
  None
  See application file for complete search history.

(56) References Cited

FOREIGN PATENT DOCUMENTS

| JP | 2015-86622 A | 5/2015 |
|---|---|---|
| KR | 10-0484921 B1 | 4/2005 |

(Continued)

OTHER PUBLICATIONS

International Search Report for International Application No. PCT/KR2020/014017 dated Feb. 2, 2021.

(Continued)

*Primary Examiner* — Krishnan S Menon
(74) *Attorney, Agent, or Firm* — STAAS & HALSEY LLP

(57) ABSTRACT

A water purifier including a raw water flow path, a first valve provided in a water purification path, a second valve provided in a wash water flow path, a purified water valve provided in a purified water supply tube, a flow sensor provided in a cooking water supply tube and sensing a flow amount of liquid flowing in the cooking water supply tube, a drainage valve provided in a drainage flow path branched from the cooking water supply tube and a controller for draining the liquid remaining in the cooking water supply tube, when a flow amount value sensed by the flow sensor for a preset period of time is less than or equal to a certain value, by controlling opening/closing of the purified water valve, the first valve, the second valve, and the drainage valve.

15 Claims, 11 Drawing Sheets

(52) U.S. Cl.
CPC .. *C02F 2201/005* (2013.01); *C02F 2209/006* (2013.01); *C02F 2209/40* (2013.01); *C02F 2209/44* (2013.01); *C02F 2301/043* (2013.01); *C02F 2303/04* (2013.01); *C02F 2307/06* (2013.01)

(56) References Cited

FOREIGN PATENT DOCUMENTS

| | | |
|---|---|---|
| KR | 10-2006-0118216 A | 11/2006 |
| KR | 10-2008-0036720 A | 4/2008 |
| KR | 10-2011-0127595 A | 11/2011 |
| KR | 10-2012-0128915 A | 11/2012 |
| KR | 10-1202885 B1 | 11/2012 |
| KR | 10-2017-0069987 A | 6/2017 |
| KR | 10-2017-0133196 A | 12/2017 |
| KR | 10-2017-0133198 A | 12/2017 |
| KR | 10-2018-0037718 A | 4/2018 |
| KR | 10-1849077 B1 | 4/2018 |
| KR | 10-1861710 B1 | 5/2018 |
| KR | 10-2018-0076462 A | 7/2018 |
| KR | 10-1884736 B1 | 8/2018 |
| KR | 10-1939746 B1 | 1/2019 |
| KR | 10-2021-0026945 A | 3/2021 |
| WO | WO-2019215971 A1 * | 11/2019 |

OTHER PUBLICATIONS

International Written Opinion for International Application No. PCT/KR2020/014017 dated Feb. 2, 2021.

* cited by examiner

WATER PURIFIER AND METHOD FOR CONTROLLING WATER PURIFIER

CROSS-REFERENCE TO RELATED APPLICATION

This application is a continuation application, under 35 U.S.C. § 111(a), of International Patent Application No. PCT/KR2020/014017, filed on Oct. 14, 2020, which claims the benefit of Korean Patent Application No. 10-2019-0166584, filed on Dec. 13, 2019, in the Korean Intellectual Property Office, the entire disclosures of which are incorporated herein by reference as a part of this application.

BACKGROUND

Field

The disclosure relates to a water purifier and method of controlling the water purifier, and more particularly, to a water purifier capable of cleaning a tube for supplying water for cooking.

Description of Related Art

Water purifiers are devices for filtering incoming water with one or more purification filters to supply clean water to the user. Even a purifier for providing water for cooking (or cooking water) is being developed these days.

The cooking water is purified water that has passed a purification filter and is commonly used for washing dishes, fruits, etc., or for cooking foods.

A cooking water lever is generally installed near a space for washing dishes, fruits, etc., or cooking foods, and thus, distant from a main body of the water purifier.

If the cooking water lever has not been opened for a long time, a fluid stagnates for a long time in a cooking water supply tube connected from the main body of the water purifier to a cooking water outlet nozzle, causing a sanitation problem of the cooking water supply tube.

To drain the stagnant fluid in the cooking water supply tube without manually operating the cooking water lever, an electric wire for automatically controlling the cooking water lever needs to be provided, but the distance between the main body of a normal water purifier and the cooking water outlet nozzle is quite distant so the electric wire needs to be long as much.

SUMMARY

According to an embodiment of the disclosure, a water purifier includes a raw water flow path formed to allow raw water to flow from outside; a first valve arranged in a water purification path connected to the raw water flow path such that the raw water passes through a water purifying filter, and opening or closing the water purification path; a second valve arranged in a wash water flow path connected to the raw water flow path such that the raw water flows without passing through the water purifying filter, and opening or closing the wash water flow path; a purified water valve arranged in a purified water supply tube connected to the water purification path such that purified water having passed through the water purification path is supplied to a water purifier outlet nozzle, and opening or closing the purified water supply tube; a flow sensor arranged in a cooking water supply tube connected to the water purification path and the wash water flow path such that the purified water having passed through the water purification path or wash water having passed through the wash water flow path is supplied to a cooking water outlet nozzle, and sensing an amount of fluid flowing in the cooking water supply tube; a drainage valve arranged in a drainage flow path branched from the cooking water supply tube such that a stagnant fluid in the cooking water supply tube is drained to the outside, and opening or closing the drainage flow path; and a controller configured to drain the stagnant fluid in the cooking water supply tube to the outside through the drainage flow path by controlling opening or closing of the purified water valve, the first valve, the second valve, and the drainage valve when a value of the flow amount sensed by the flow sensor for a preset period of time is equal to or less than a preset value.

The controller may provide purified water having passed the water purification path to the cooking water supply tube by closing the second valve and the purified water valve and opening the first valve and the drainage valve.

The controller may provide wash water having passed the wash water flow path to the cooking water supply tube by closing the first valve and the purified water valve and opening the second valve and the drainage valve.

The water purifier may further include an electrolyser provided in the wash water flow path for electrolyzing raw water flowing in the wash water flow path, and the controller may operate the electrolyser to electrolyze the raw water flowing in the wash water flow path.

The water purifier may further include an ultraviolet lamp provided in the wash water flow path for sterilizing the raw water flowing in the wash water flow path, and the controller may operate the ultraviolet lamp to sterilize the raw water flowing in the wash water flow path.

The controller may close the drainage valve when a flow amount value sensed by the flow sensor is equal to or greater than a threshold value after closing the second valve and the purified water valve and opening the first valve and the drainage valve.

The controller may provide purified water having passed the water purification path to the cooking water supply tube by opening the first valve and closing the second valve based on a flow amount value sensed by the flow sensor being equal to or greater than a threshold after closing the first valve and the purified water valve and opening the second valve and the drainage valve.

The controller may close the drainage valve based on a flow amount value sensed by the flow sensor being equal to or greater than the threshold after opening the first valve and closing the second valve.

The threshold value may be set to be proportional to a volume of the cooking water supply tube.

The cooking water supply tube has a length longer than a length of the purified water supply tube.

According to an embodiment of the disclosure, a method for controlling a water purifier including a raw water flow path formed to bring in raw water from outside, a first valve arranged in a water purification path connected to the raw water flow path such that the raw water passes through a water purifying filter, and opening or closing the water purification path, a second valve arranged in a wash water flow path connected to the raw water flow path such that the raw water flows without passing through the water purifying filter, and opening or closing the wash water flow path, a purified water valve arranged in a purified water supply tube connected to the water purification path such that purified water having passed through the water purification path is supplied to a water purifier outlet nozzle, and opening or closing the purified water supply tube, a flow sensor arranged in a cooking water supply tube connected to the water purification path and the wash water flow path such that the purified water having passed through the water purification path or wash water having passed through the wash water flow path is supplied to a cooking water outlet nozzle, and sensing an amount of fluid flowing in the cooking water supply tube, and a drainage valve arranged in a drainage flow path branched from the cooking water supply tube such that a stagnant fluid in the cooking water supply tube is drained to the outside, and opening or closing the drainage flow path, the method includes determining whether a flow amount value sensed by the flow sensor for a preset period of time is equal to or less than a preset value; and draining a stagnant fluid in the cooking water supply tube to the outside through the drainage flow path by controlling opening or closing of the purified water valve, the first valve, the second valve, and the drainage valve based on the flow amount value sensed by the flow sensor for the preset period of time being equal to or less than the preset value.

The draining of the stagnant fluid in the cooking water supply tube to the outside through the drainage flow path by controlling opening or closing of the purified water valve, the first valve, the second valve, and the drainage valve may include providing purified water having passed the water purification path to the cooking water supply tube by closing the second valve and the purified water valve and opening the first valve and the drainage valve.

The draining of the stagnant fluid in the cooking water supply tube to the outside through the drainage flow path by controlling opening or closing of the purified water valve, the first valve, the second valve, and the drainage valve may include providing wash water having passed the wash water flow path to the cooking water supply tube by closing the first valve and the purified water valve and opening the second valve and the drainage valve.

The providing of the wash water having passed the wash water flow path to the cooking water supply tube by closing the first valve and the purified water valve and opening the second valve and the drainage valve may include electrolyzing the raw water flowing in the wash water flow path by operating an electrolyser; and providing the electrolyzed raw water to the cooking water supply tube.

The providing of the wash water having passed the wash water flow path to the cooking water supply tube by closing the first valve and the purified water valve and opening the second valve and the drainage valve may include sterilizing the raw water flowing in the wash water flow path by operating an ultraviolet lamp; and providing the sterilized raw water to the cooking water supply tube.

The method of controlling the water purifier may further include closing the drainage valve based on a flow amount value sensed by the flow sensor being equal to or greater than a threshold after closing the second valve and the purified water valve and opening the first valve and the drainage valve.

The method of controlling the water purifier may further include opening the first valve and closing the second valve to provide purified water having passed the water purification path to the cooking water supply tube based on a flow amount value sensed by the flow sensor being equal to or greater than a threshold after closing the first valve and the purified water valve and opening the second valve and the drainage valve.

The method of controlling the water purifier may further include closing the drainage valve based on a flow amount value sensed by the flow sensor being equal to or greater than the threshold after opening the first valve and closing the second valve.

The threshold value may be set to be proportional to a volume of the cooking water supply tube.

The cooking water supply tube has a length longer than a length of the purified water supply tube.

DETAILED DESCRIPTION

Figure 1:
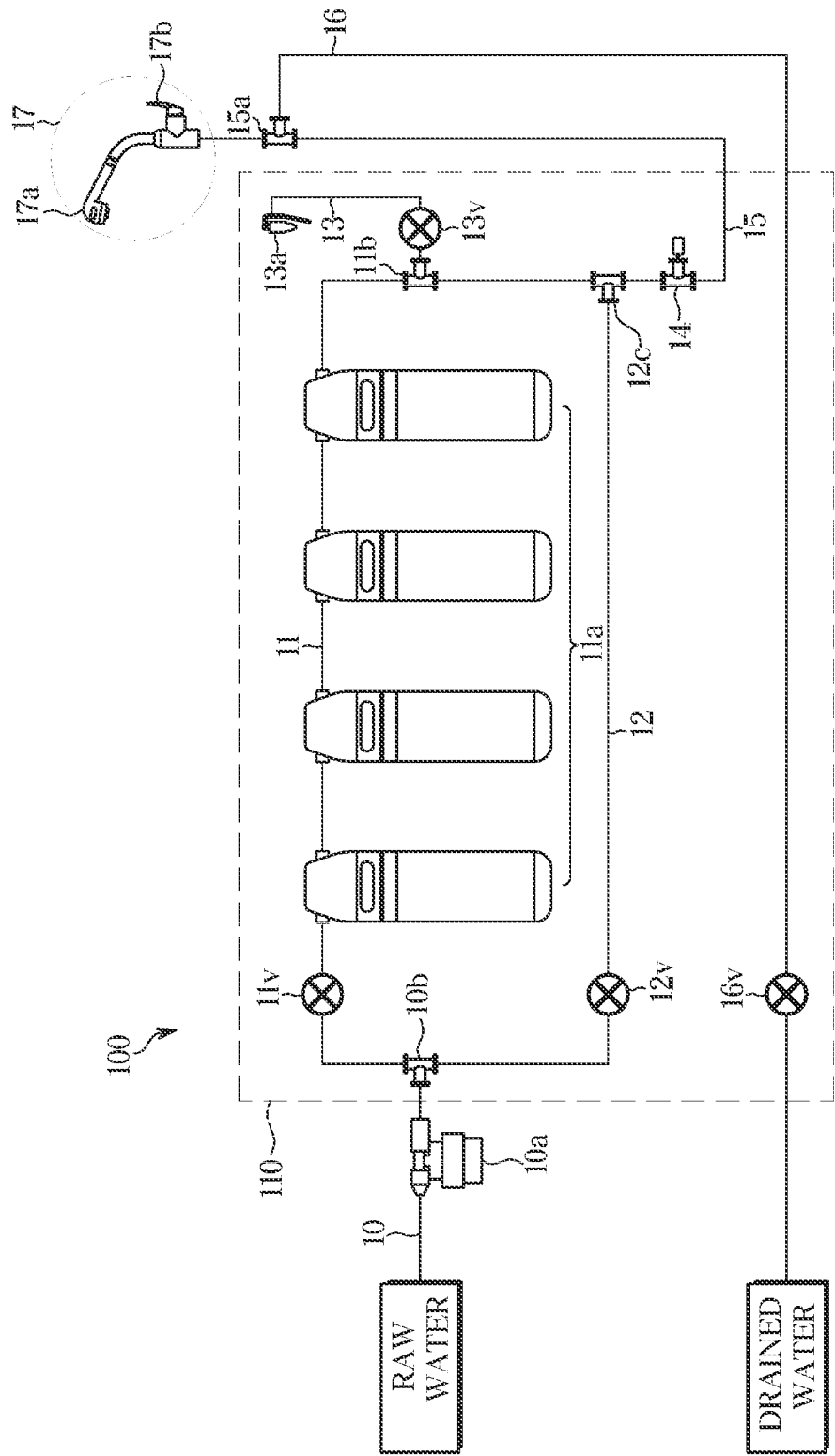
FIG. 1 is a diagram for describing an internal structure of a water purifier, according to an embodiment.

These and/or other aspects of the disclosure will become apparent and more readily appreciated from the following description of embodiments, taken in conjunction with the accompanying drawings of which:

Embodiments and features as described and illustrated in the disclosure are merely examples, and there may be various modifications replacing the embodiments and drawings at the time of filing this application.

It will be further understood that the term "connect" or its derivatives refer both to direct and indirect connection, and the indirect connection includes a connection over a wireless communication network.

The terminology used herein is for the purpose of describing particular embodiments only and is not intended to limit the disclosure. It is to be understood that the singular forms "a," "an," and "the" include plural references unless the context clearly dictates otherwise. It will be further understood that the terms "comprise" and/or "comprising," when used in this specification, specify the presence of stated features, integers, steps, operations, elements, and/or components, but do not preclude the presence or addition of one or more other features, integers, steps, operations, elements, components, and/or groups thereof.

The terms including ordinal numbers like "first" and "second" may be used to explain various components, but the components are not limited by the terms. The terms are only for the purpose of distinguishing a component from another. Thus, a first element, component, region, layer or room discussed below could be termed a second element, component, region, layer or section without departing from the teachings of the disclosure.

Furthermore, the terms, such as "~ part", "~ block", "~ member", "~ module", etc., may refer to a unit of handling at least one function or operation. For example, the terms may refer to at least one process handled by hardware such as field-programmable gate array (FPGA)/application specific integrated circuit (ASIC), etc., software stored in a memory 22, or at least one processor.

Reference numerals used for method steps are just used to identify the respective steps, but not to limit an order of the steps. Thus, unless the context clearly dictates otherwise, the written order may also be practiced otherwise.

An aspect of the disclosure provides a water purifier for preventing a sanitation problem of a cooking water supply tube occurring when a cooking water lever has not been opened for a long period of time.

Another aspect of the disclosure provides a water purifier for allowing the water purifier and a cooking water lever to be installed at desired positions.

According to an embodiment of the disclosure, clean water for cooking may always be supplied to the user by automatically cleaning inside of a cooking water supply tube and draining in certain cycles without a need for the user to operate a cooking water lever.

Furthermore, according to an embodiment of the disclosure, the user may install a water purifier and a cooking water lever at any position without constraint.

Reference will now be made in detail to embodiments of the disclosure, which are illustrated in the accompanying drawings.

FIG. 1 is a diagram for describing an internal structure of a water purifier, according to an embodiment.

Referring to FIG. 1, a water purifier 100 may include a raw water flow path 10 provided to bring in raw water from the outside, a water purification path 11 connected to the raw water flow path 10 such that the raw water flows to pass through water purification filters 11a, a wash water flow path 12 connected to the raw water flow path 10 such that the raw water flows not to pass through the water purification filters 11a, a purified water supply tube 13 connected to the water purification path 11 to supply purified water having passed the water purification path 11 to a purified water outlet nozzle 13a, a cooking water supply tube 15 connected to the water purification path 11 and the wash water flow path 12 to supply the purified water having passed the water purification path 11 or wash water having passed the wash water flow path 12 to a cooking water outlet nozzle 17a, and a drainage flow path 16 branched from the cooking water supply tube 15 to drain a stagnant fluid in the cooking water supply tube 15 to the outside.

There may be a decompression valve 10a installed in the raw water flow path 10 to regulate water pressure of raw water. The raw water having water pressure is regulated by the decompression valve 10a may be supplied to the water purification path 11 and/or the wash water flow path 12 through a joint 10b.

The water purification path 11 may include at least one water purification filter 11a placed in the water purification path 11 to filter the raw water. There may also be a first valve 11v arranged in the water purification path 11 for opening or closing the water purification path 11.

When the first valve 11v is closed, the raw water supplied from the raw water flow path 10 through the joint 10b is prevented from passing the water purification path 11, and when the first valve 11v is opened, the row water supplied through the joint 10b may pass the water purification path 11 so that purified water filtered by the water purification filter 11a may be provided to the purified water supply tube 13 and/or the cooking water supply tube 15.

Specifically, a joint 11b is arranged in the water purification path 11, so that purified water having passed the joint 11b may be provided to the purified water supply tube 13 or may pass another joint 12c to be provided to the cooking water supply tube 15.

There may also be a purified water valve 13v arranged in the purified water supply tube 13 for opening or closing the purified water supply tube 13. When the purified water valve 13v is closed, the purified water supplied through the joint 11b may not pass the water purification path 11 and may not be discharged to the purified water outlet nozzle 13a, and when the purified water valve 13v is opened, the purified water supplied through the joint 11b may pass the purified water supply tube 13 and be discharged to the purified water outlet nozzle 13a.

Although not shown, a flowmeter may be installed in the purified water supply tube 13, and the flowmeter installed in the purified water supply tube 13 may detect a flow amount of the purified water discharged through the purified water outlet nozzle 13a.

There may also be a second valve 12v arranged in the wash water flow path 12 for opening or closing the wash water flow path 12. Although not shown, an electrolyser 18 and/or an ultraviolet lamp 19 may be arranged in the wash water flow path 12 as will be described below.

When the second valve 12v is closed, the raw water supplied from the raw water flow path through the joint 10b may be prevented from passing through the wash water flow path 12, and when the second valve 12v is opened, the raw water supplied through the joint 10b may pass through the wash water flow path 12 and be provided to the cooking water supply tube 15.

Specifically, when the second valve 12v is opened, wash water that has passed through the wash water flow path 12 may be provided to the cooking water supply tube 15 through the joint 12c.

Without the electrolyser 18 or the ultraviolet lamp 19 arranged in the wash water flow path 12, the wash water that has passed the wash water flow path 12 may be the raw water; with the electrolyser 18 arranged in the wash water flow path 12, the wash water that has passed the wash water flow path 12 may be sterilized water by electrolysis; with the ultraviolet lamp 19 arranged in the wash water flow path 12, the wash water that has passed the wash water flow path 12 may be sterilized water by ultraviolet.

The cooking water supply tube 15 may receive purified water provided from the water purification path 11 and/or wash water provided from the wash water flow path 12 through the joint 12c.

Furthermore, the cooking water supply tube 15 may be connected to a cooking water part 17 to provide water for cooking (or cooking water) to the user. In this case, the cooking water part 17 may include the cooking water outlet nozzle 17a for discharging cooking water supplied from the cooking water supply tube 15 and a cooking water lever 17b for opening or closing the cooking water outlet nozzle 17a according to opening or closing operation.

The user may be provided with the cooking water by manually opening the cooking water lever 17b and may stop supplying the cooking water by manually closing the cooking water lever 17b.

Types of the cooking water supplied through the cooking water outlet nozzle 17a may be purified water, raw water, and/or sterilized water. For example, when the user selects the type of the cooking water to be the purified water through an input module (not shown) arranged in the water purifier main body 110, the controller 20 may open the first valve 11v and close the second valve 12v. Furthermore, when the user selects the type of the cooking water to be the sterilized water, the controller 20 closes the first valve 11v and opens the second valve 12v and may then operate the electrolyser 18 or the ultraviolet lamp 19 arranged in the wash water flow path 12.

When the user is provided with the cooking water by opening the cooking water lever 17b, a flow sensor 14 arranged in the cooking water supply tube 15 may detect an amount of a fluid flowing in the cooking water supply tube 15.

When the controller 20 drains the stagnant fluid in the cooking water supply tube 15 to the outside by opening a drainage valve 16v even when the user has closed the cooking water lever 17b, the flow sensor 14 may detect an amount of the fluid flowing in the cooking water supply tube 15.

In other words, the flow sensor 14 may detect an amount of the fluid flowing in the cooking water supply tube 15 regardless of whether the cooking water lever 17b is opened or closed.

The drainage flow path 16 may be formed by being branched from the cooking water supply tube 15 to drain the stagnant fluid in the cooking water supply tube 15 to the outside. The drainage flow path 16 is a flow path that aims at draining the stagnant fluid in the cooking water supply tube 15, and may be preferable to be formed as close to the cooking water part 17 as possible.

In an embodiment of the disclosure, the water purifier 100 may be equipped with the drainage flow path 16 formed by being branched from the cooking water supply tube 15 to drain the stagnant fluid in the cooking water supply tube 15 even without operation of the cooking water lever 17b.

There may be a drainage valve 16v arranged in the drainage flow path 16 to open or close the drainage flow path 16. When the drainage valve 16v is opened, the fluid provided to the joint 15a through the cooking water supply tube 15 may be drained to the outside through the drainage flow path 16.

The drainage valve 16v may be opened or closed under the control of the controller 20, and it is desirable to arrange the drainage valve 16v in the water purifier main body 110 to receive control signals from the controller 20. Specifically, when the drainage valve 16v is arranged to be close to the cooking water part 17, an electric wire may be lengthened to receive the control signal from the controller 20, thereby arising various problems such as a cost problem, a control speed problem, etc.

Although not shown, the water purifier 100 may further include a hot water module and a cold water module for producing hot water and cold water, respectively, to be discharged through the purified water outlet nozzle 13a and/or the cooking water outlet nozzle 17a. The hot water module and the cold water module are components that may be understood by those of ordinary skill in the art, so the detailed description will be omitted.

The internal structure of the water purifier 100 according to an embodiment has thus far been described in detail. Differences between the purified water supply tube 13 and the cooking water supply tube 15 will now be described with reference to FIG. 2.

Figure 2:
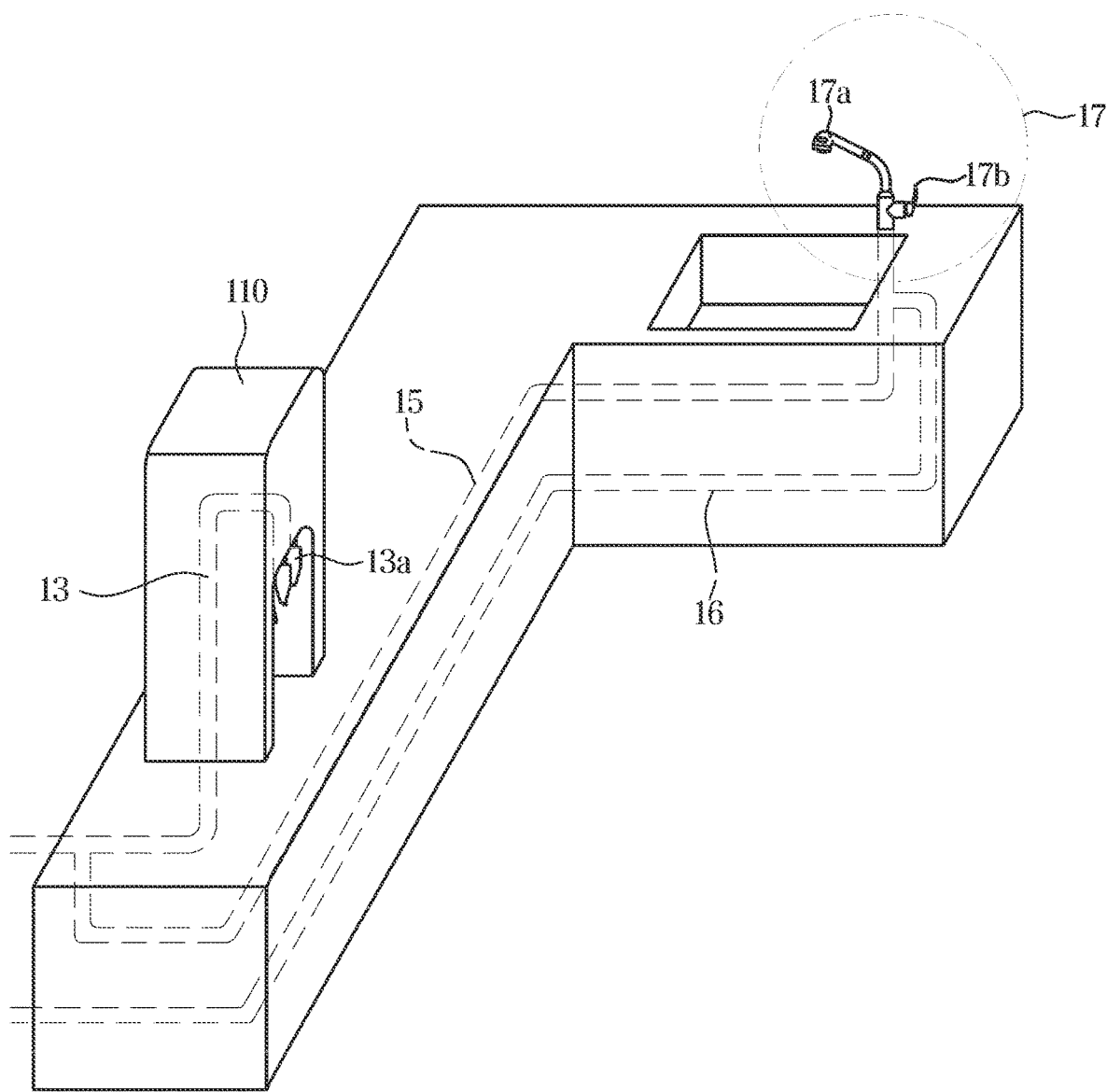
FIG. 2 illustrates a water purifier installed at a kitchen, according to an embodiment.

FIG. 2 illustrates a water purifier installed at a kitchen, according to an embodiment. Referring to FIG. 2, the water purifier main body 110 may be located at a place where the user easily receives water fit to drink, and the cooking water part 17 may be located at a place close to a space for washing dishes, fruits, etc., or cooking foods. For example, the cooking water part 17 may be arranged near the washbasin, and the water purifier main body 110 may be arranged on a side near the living room.

As it is common for the purified water outlet nozzle 13a to be arranged at or near the water purifier main body 110, the controller 20 may receive an input signal from a user who wants to receive purified water even with a short wire. In other words, the controller 20 may control the purified water valve 13v in response to receiving the user input on the input module of the water purifier main body 110 even without the user's manual lever operation. Accordingly, the controller 20 may automatically drain the stagnant fluid in the purified water supply tube 13 by controlling the purified water valve 13v.

On the contrary, the cooking water part 17 is arranged to be distant from the water purifier main body 110, so it is difficult in reality for the controller 20 to be equipped with a long wire to receive an electric signal according to an operation of the cooking water lever 17b. Hence, the water purifier 100 according to an embodiment of the disclosure may be equipped with the drainage flow path 16 for automatically draining the stagnant fluid in the cooking water supply tube 15.

The cooking water supply tube 15 according to an embodiment of the disclosure may be longer than the purified water supply tube 13, and those of ordinary skill in the art may readily understand that the embodiment of the disclosure is characterized to automatically drain a stagnant fluid in the cooking water supply tube 15 as compared to prior technologies that automatically drain a stagnant fluid in the purified water supply tube.

Components of the water purifier 100 according to an embodiment will now be described with reference to FIG. 3.

Figure 3:
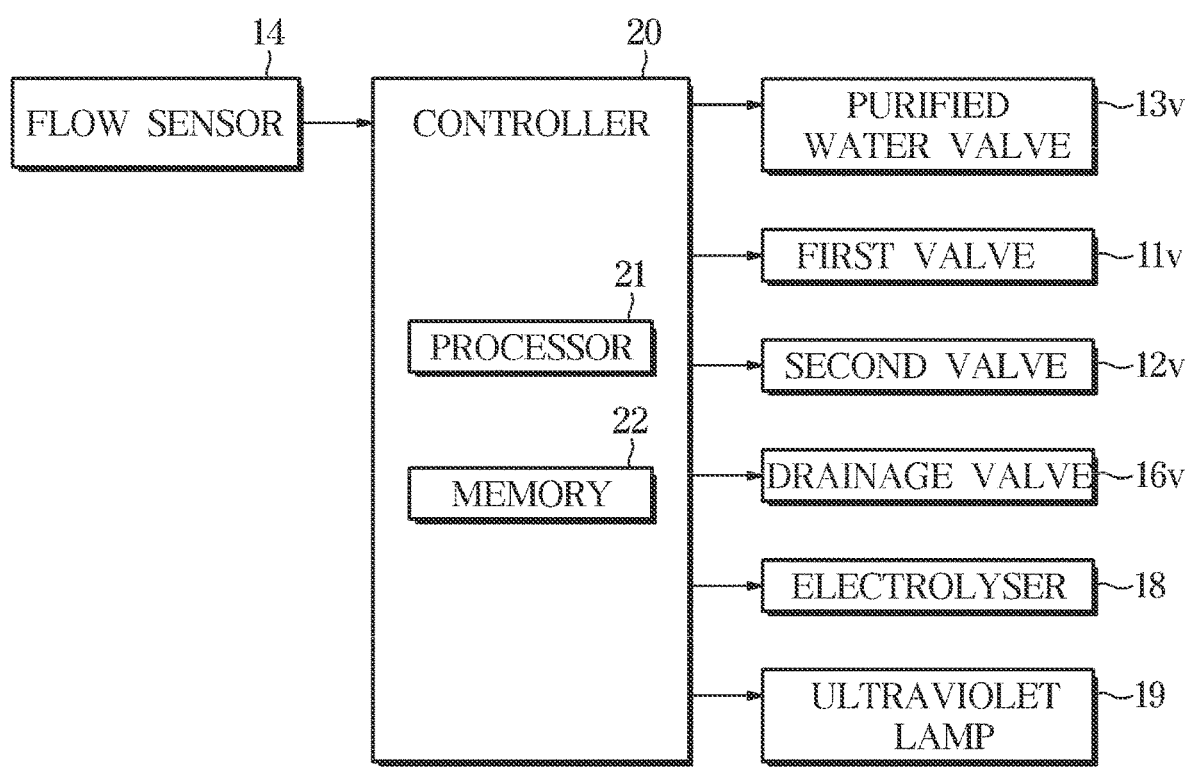
FIG. 3 is a control block diagram of a water purifier, according to an embodiment.

FIG. 3 is a control block diagram of a water purifier, according to an embodiment. Referring to FIG. 3, the water purifier 100 according to an embodiment may include the first valve 11v for opening or closing the water purification path 11, the second valve 12v for opening or closing the wash water flow path 12, the purified water valve 13v for opening or closing the purified water supply tube 13, the flow sensor 14 for detecting an amount of a fluid flowing in the cooking water supply tube 15, the drainage valve 16v for opening or closing the drainage flow path 16, the electrolyser 18 for electrolyzing a fluid passing the wash water flow path 12, the ultraviolet lamp 19 for irradiating ultraviolet light to the fluid passing the wash water flow path 12, and the controller 20 for controlling opening or closing of the first valve 11v, the second valve 12v, the purified water valve 13v and the drainage valve 16v and controlling operations of the electrolyser 18 and/or the ultraviolet lamp 19.

The purified water valve 13v may open or close the purified water supply tube 13 according to a control signal of the controller 20; the drainage valve 16v may open or close the drainage flow path 16 according to a control signal of the controller 20; the first valve 11v may open or close the water purification path 11 according to a control signal of the controller 20; the second valve 12v may open or close the wash water flow path 12 according to a control signal of the controller 20.

For this, the purified water valve 13v, the drainage valve 16v, the first valve 11v and the second valve 12v may include electronic valves to be opened or closed according to control signals of the controller 20, without being limited thereto.

The electrolyser 18 may be arranged in the wash water flow path 12 for producing sterilized water by electrolyzing the raw water passing the wash water flow path 12.

The ultraviolet lamp 19 may be arranged in the wash water flow path 12 for producing sterilized water by irradiating the ultraviolet light to the raw water passing the wash water flow path 12.

The controller 20 may create control signals for controlling the electrolyser 18, the ultraviolet lamp 19, the purified water valve 13v, the drainage valve 16v, the first valve 11v and the second valve 12v based on a value of a flow amount detected by the flow sensor 14.

For example, the controller 20 may control opening or closing of the purified water valve 13v, the drainage valve 16v, the first valve 11v and the second valve 12v to drain the stagnant fluid in the cooking water supply tube 15 to the outside through the drainage flow path 16, when a value of a flow amount detected by the flow sensor 14 for a preset period of time is equal to or less than a preset value.

Furthermore, when a value of a flow amount detected by the flow sensor 14 for a preset period of time is equal to or less than a preset value, the controller 20 may operate the electrolyser 18 and/or the ultraviolet lamp 19 to produce sterilized water for cleaning the cooking water supply tube 15.

For this, the controller 20 may include at least one memory 22 for storing data about an algorithm for controlling operations of the components in the water purifier 100 including the purified water valve 13v, the drainage valve 16v, the first valve 11v and the second valve 12v or a program implementing the algorithm, and at least one processor 21 for performing operations as described above or as will be described below using the data stored in the memory 22.

In a case that the memory 22 and the processor 21 are each provided in the plural, the memory 22 and the processor 21 may be integrated in a single chip or physically distributed.

The processor 21 may be implemented using various components such as a semiconductor chip, a switch, an integrated circuit, a resistor, a volatile or non-volatile memory, or a printed circuit board, or implemented using an electronic control unit (ECU).

The memory 22 may be implemented with at least one of a non-volatile memory device, such as cache, read only memory (ROM), programmable ROM (PROM), erasable programmable ROM (EPROM), electrically erasable programmable ROM (EEPROM), and a flash memory, a volatile memory device, such as random access memory (RAM), or a storage medium, such as hard disk drive (HDD) or compact disk ROM (CD-ROM), without being limited thereto. It is not, however, limited thereto, and the memory 22 may have any type that is capable of storing various information.

The processor 21 may control opening or closing of the purified water valve 13v, the drainage valve 16v, the first valve 11v and the second valve 12v, when a value of a flow amount detected by the flow sensor 14 for a preset period of time is equal to or less than a preset value. In this case, the memory 22 may store the preset period of time or the preset value.

For example, the preset period of time may be set to 24 hours, and the preset value may be set depending on the volume of the cooking water supply tube 15.

When cooking water as much as equal to or greater than the preset value is not discharged for the preset period of time through the cooking water outlet nozzle 17a, it may be determined that the fluid has stagnated for a long time in the cooking water supply tube 15.

Specifically, when a value of a flow amount detected by the flow sensor 14 for the preset period of time is equal to or less than the preset value, the controller 20 may determine that the fluid has stagnated for a long time in the cooking water supply tube 15 and control opening or closing of the purified water valve 13v, the first valve 11v, the second valve 12v, and the drainage valve 16v to drain the stagnant fluid in the cooking water supply tube 15 to the outside through the drainage flow path 16.

In the embodiment, in a case that the user has not used cooking water for a certain period of time, the water purifier 100 automatically drains the stagnant fluid in the cooking water supply tube 15 and cleans the cooking water supply tube 15, thereby preventing a sanitary problem of the cooking water due to fur or molds inside the cooking water supply tube 15.

Furthermore, although not shown, the water purifier 100 may include an input module (not shown) equipped in the water purifier main body 110 for receiving various commands from the user. The controller 20 may provide purified water through the purified water outlet nozzle 13a by opening the purified water valve 13v at a user input command to discharge purified water. Moreover, the controller 20 may provide hot water and cold water through the purified water outlet nozzle 13a by operating various valves so that the purified water having passed the water purification path 11 is discharged by passing the hot water module and the cold water module, at a user input command to discharge hot water and a user input command to discharge cold water, respectively.

Similarly, the controller 20 may operate various valves so that the purified water having passed the water purification path 11 is provided through the cooking water outlet nozzle 17a by passing the hot water module and the cold water module, at a user input command to discharge hot cooking water and a user input command to discharge cold cooking water, respectively.

Various components of the water purifier 100 according to an embodiment have thus far been described. A case of the water purifier 100 washing the cooking water supply tube 15 with purified water will now be described with reference to FIGS. 4 and 5.

Figure 4:
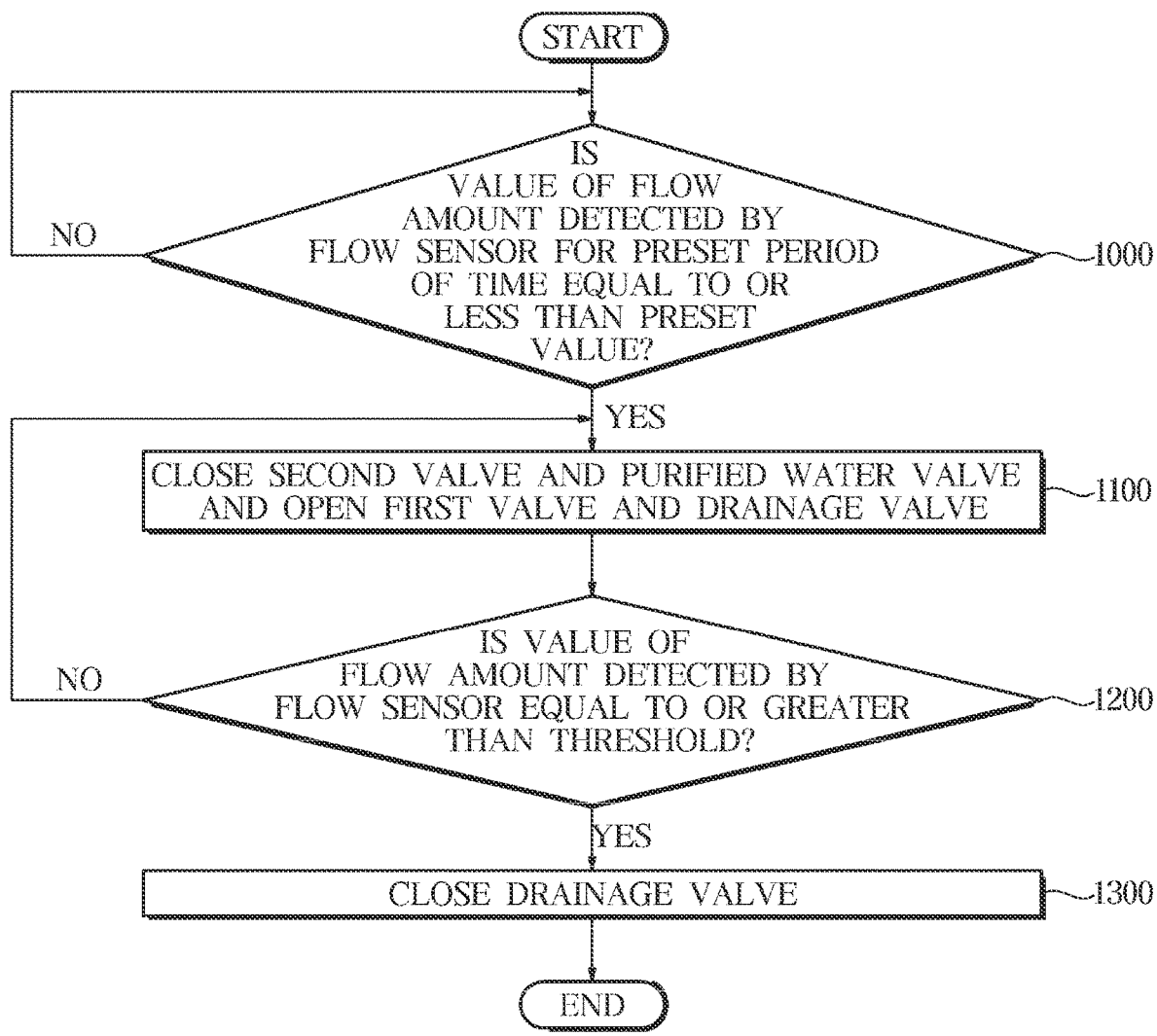
FIG. 4 is a flowchart illustrating a method of controlling a water purifier in a case that water for cleaning is purified water, according to an embodiment.
Figure 5:
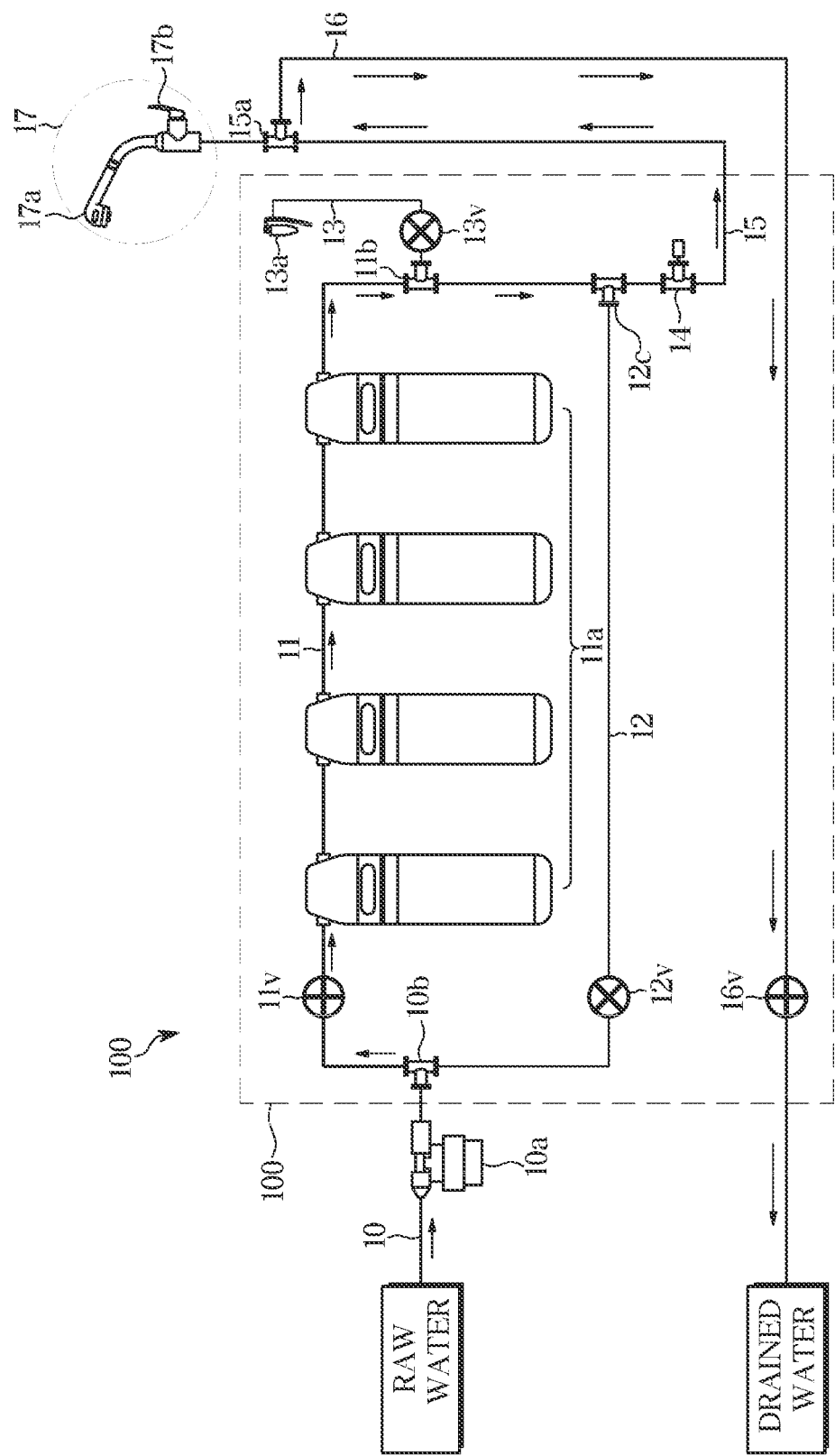
FIG. 5 is a diagram for describing a washing course in a case that water for cleaning is purified water, according to an embodiment.

FIG. 4 is a flowchart illustrating a method of controlling a water purifier in a case that water for cleaning is purified water, and FIG. 5 is a diagram for describing a washing course in a case that water for cleaning is purified water.

The flow sensor 14 may detect an amount of a fluid flowing in the cooking water supply tube 15, and the controller 20 may determine whether a value of the flow amount detected by the flow sensor 14 for a preset period of time is equal to or less than a preset value, in 1000.

When the value of the flow amount detected by the flow sensor 14 for the preset period of time is equal to or less than the preset value in 1000, the controller 20 may provide purified water having passed the water purification path 11 to the cooking water supply tube 15 in 1100, by closing the second valve 12v and the purified water valve 13v and opening the first valve 11v and the drainage valve 16v.

Referring to FIG. 5, in a case that the second valve 12v and the purified water valve 13v are closed and the first valve 11v and the drainage valve 16v are opened, it may be seen that raw water that has passed the raw water flow path 10 passes the joint 10b, is filtered by the water purification filter 11a through the water purification path 11, passes the joint 12c, and is provided to the cooking water supply tube 15.

Furthermore, as the drainage valve 16v is opened, it may be seen that the purified water provided to the cooking water supply tube 15 washes the cooking water supply tube 15 and is drained to the outside through the drainage flow path 16.

According to the embodiment, as the cooking water supply tube 15 is washed with the purified water, the user may use the purified water as cooking water right away without an extra course after the cooking water supply tube 15 is washed.

The controller 20 may determine whether a value of a flow amount detected by the flow sensor 14 is equal to or greater than a threshold in 1200, after closing the second valve 12v and the purified water valve 13v and opening the first valve 11v and the drainage valve 16v. When the value of the flow amount detected by the flow sensor 14 is equal to or greater than the threshold in 1200, the controller 20 may finish the course of washing the cooking water supply tube 15 by closing the drainage valve 16v.

In this case, the threshold may be set based on the volume of the cooking water supply tube 15. The cooking water supply tube 15 may be completely washed when the value of the flow amount of the purified water that has passed the cooking water supply tube 15 is equal to or greater than the volume of the cooking water supply tube 15, so the threshold may be set to be equal to or greater than the volume of the cooking water supply tube 15.

In other words, the threshold may be set to be proportional to the volume of the cooking water supply tube 15.

According to the embodiment, the threshold may be set based on the volume of the cooking water supply tube 15, the value of the flow amount detected by the flow sensor 14 is compared with the threshold after a course of washing the cooking water supply tube 15 is started and then the washing course is finished, thereby efficiently washing the cooking water supply tube 15 with a minimum amount of purified water.

A case of the water purifier 100 washing the cooking water supply tube 15 with raw water, sterilized water by electrolysis or sterilized water by ultraviolet will now be described with reference to FIGS. 6 and 11.

Figure 6:
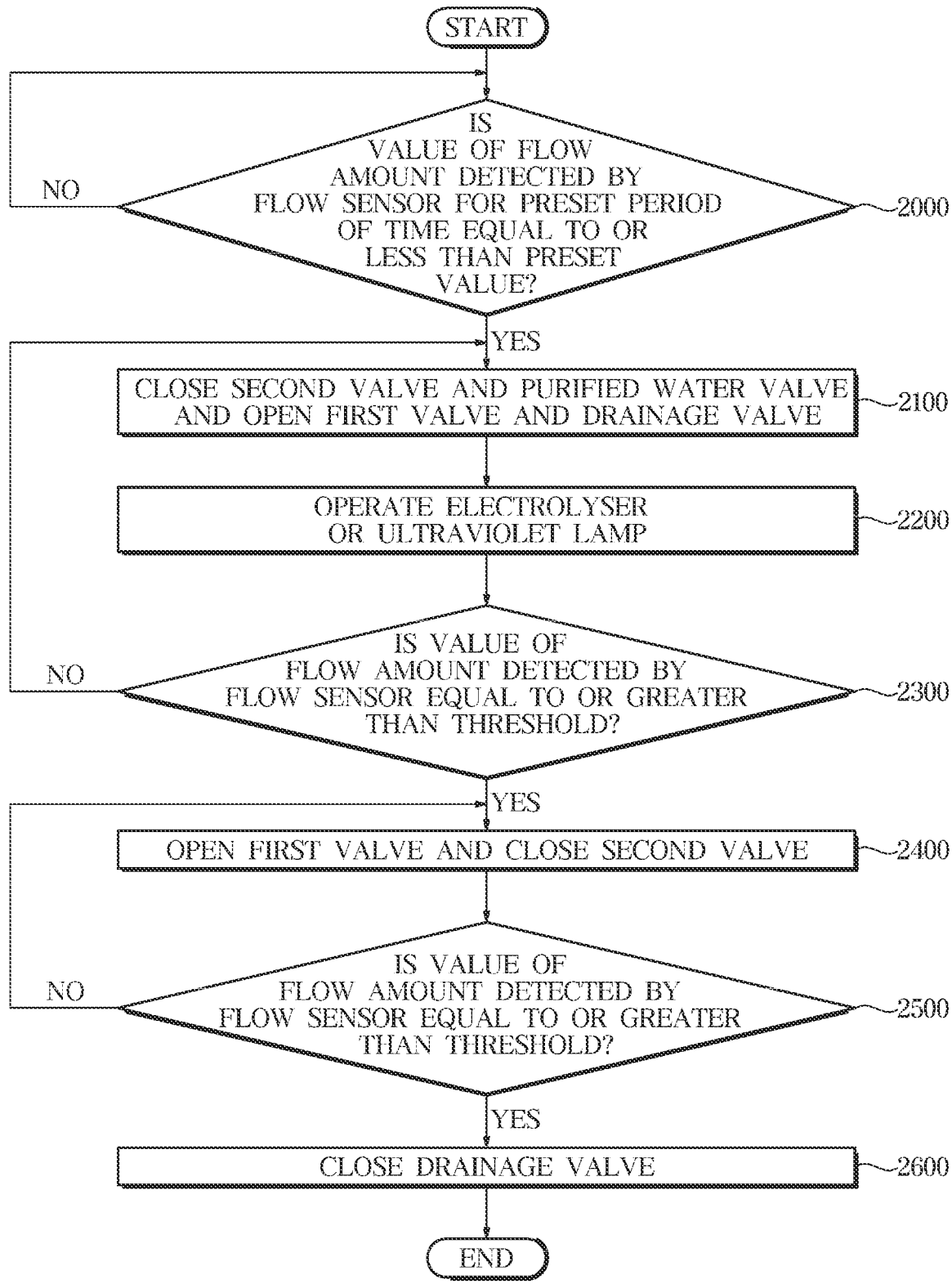
FIG. 6 is a flowchart illustrating a method of controlling a water purifier in a case that water for cleaning is raw water, according to an embodiment.
Figure 7:
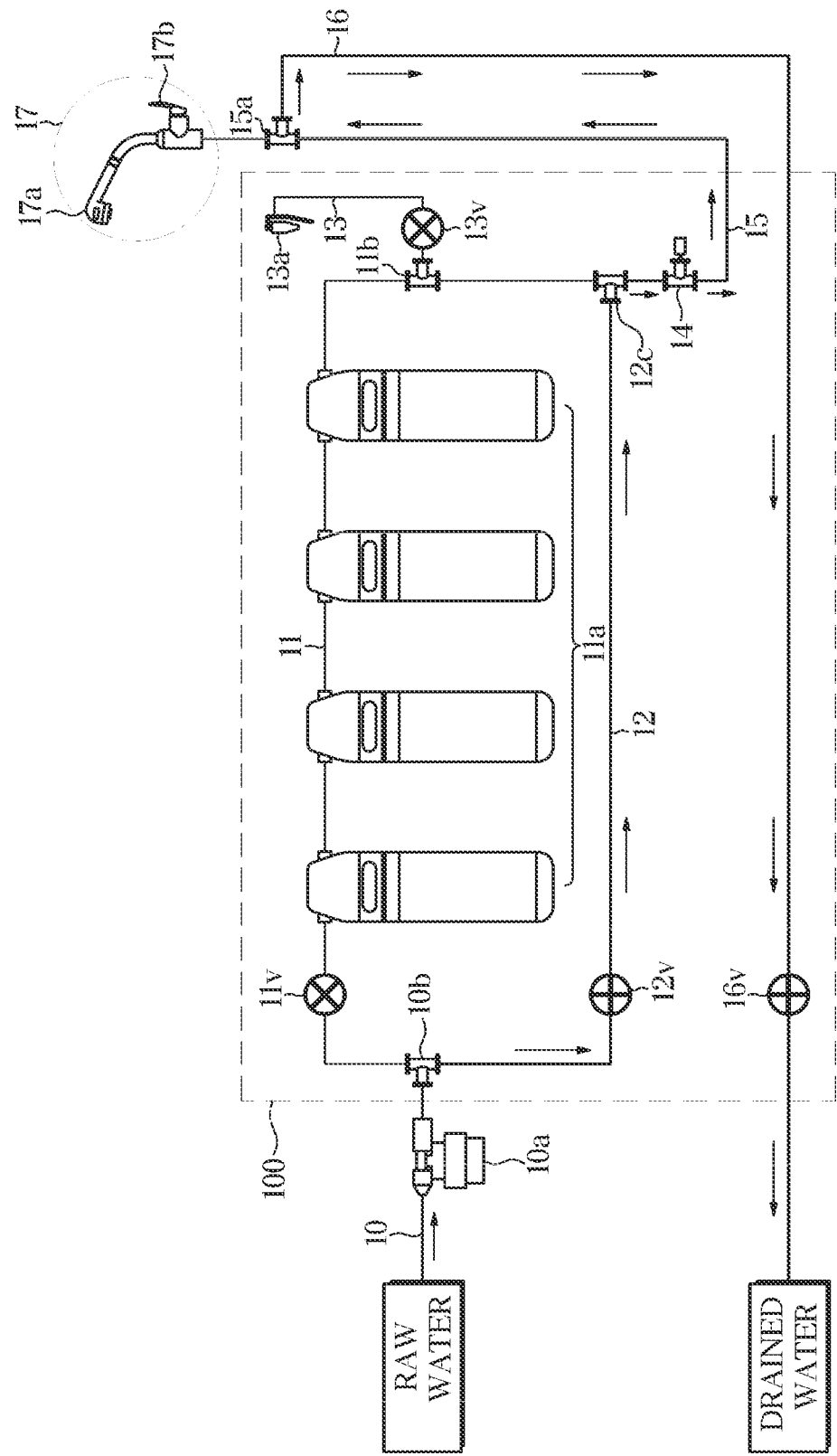
FIG. 7 is a diagram for describing a washing course in a case that water for cleaning is raw water, according to an embodiment.
Figure 8:
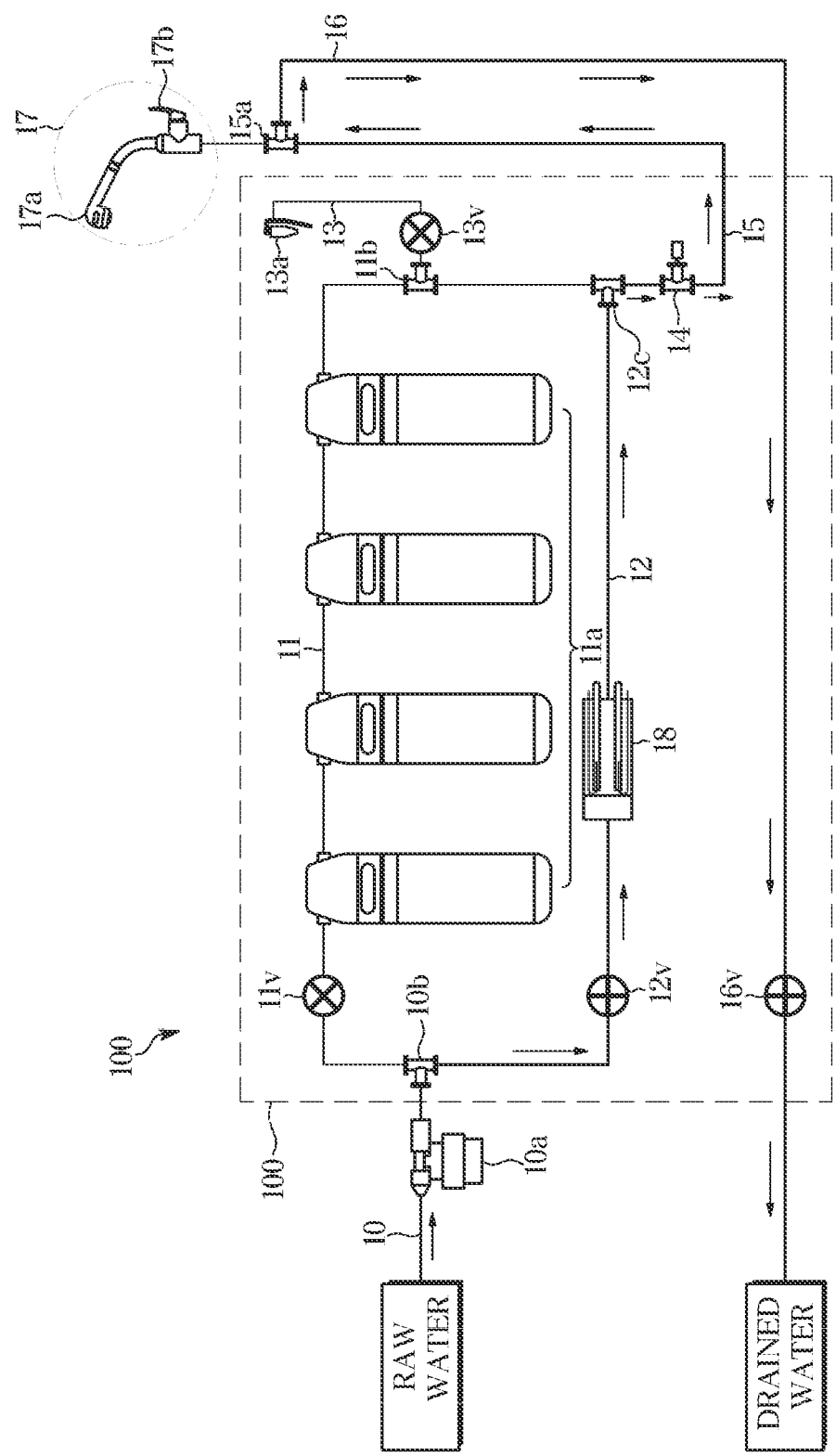
FIG. 8 is a diagram for describing a washing course in a case that water for cleaning is sterilized water by electrolysis, according to an embodiment.
Figure 9:
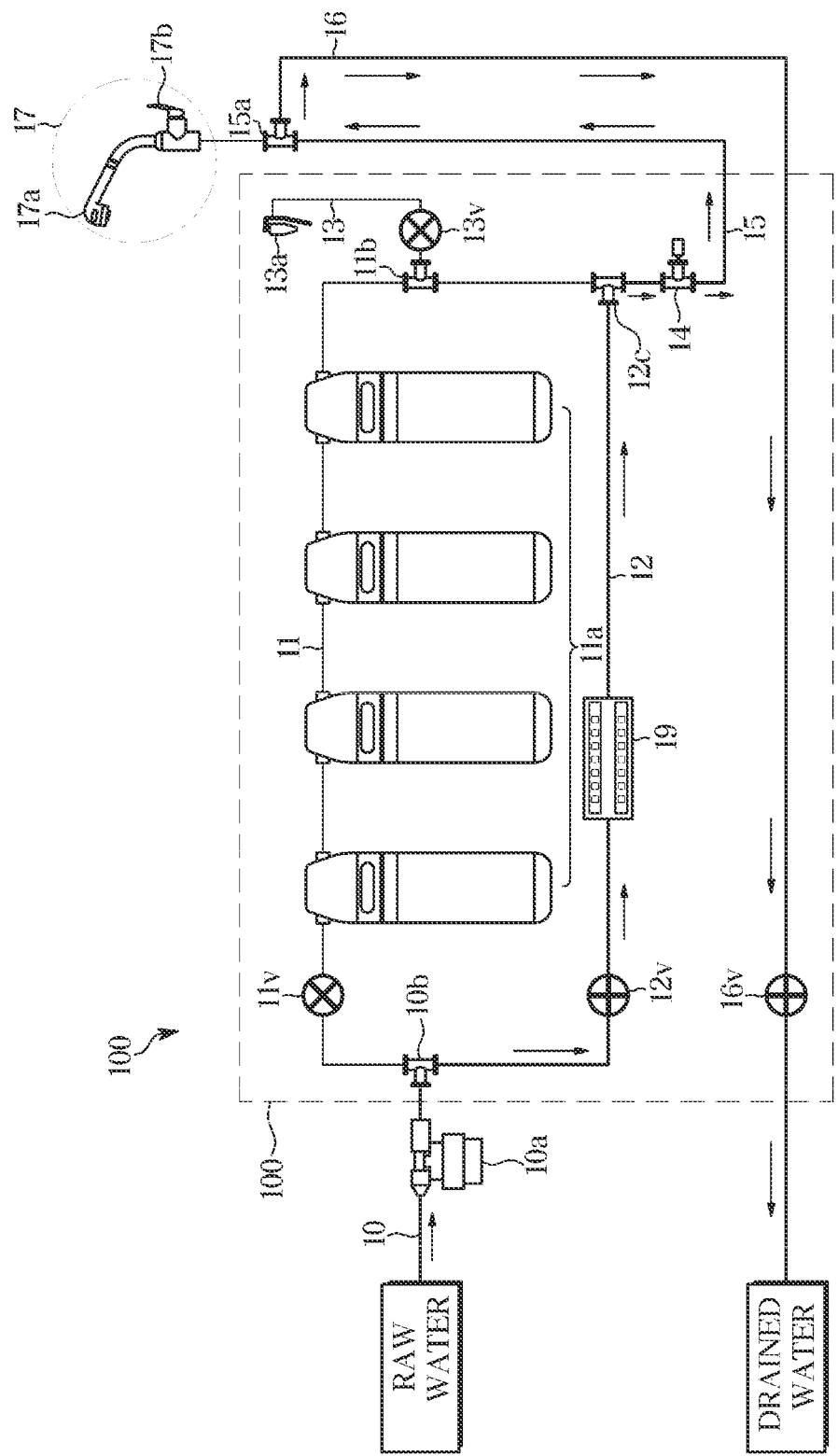
FIG. 9 is a diagram for describing a washing course in a case that water for cleaning is sterilized water which is sterilized by ultraviolet rays, according to an embodiment.

FIG. 6 is a flowchart illustrating a method for controlling a water purifier in a case that water for cleaning is raw water, FIG. 7 is a diagram for describing a washing course in a case that water for cleaning is raw water, FIG. 8 is a diagram for describing a washing course in a case that water for cleaning is sterilized water by electrolysis, and FIG. 9 is a diagram for describing a washing course in a case that water for cleaning is sterilized water which is sterilized by ultraviolet rays.

Figure 10:
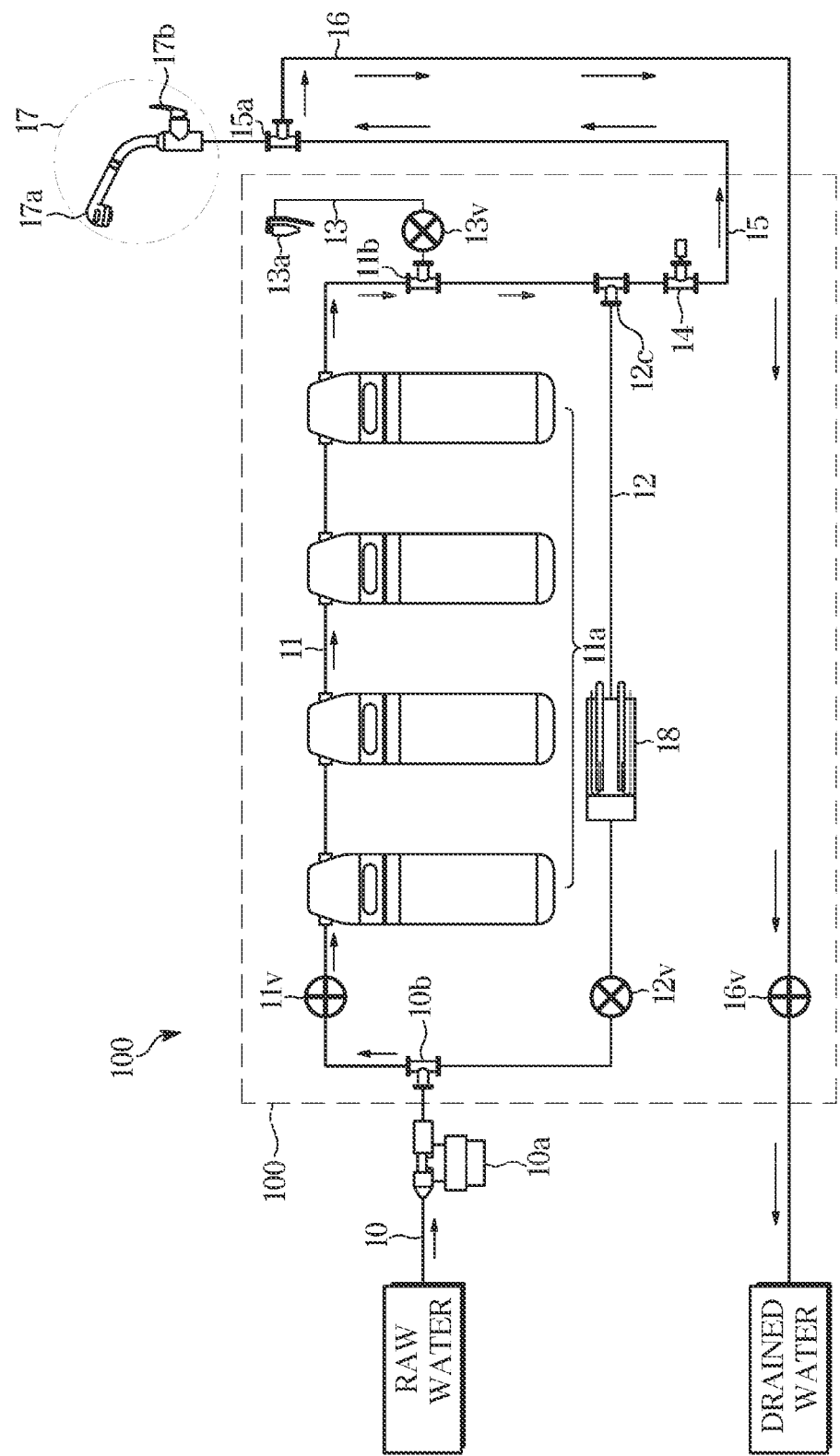
FIG. 10 is a diagram for describing a rinsing course in a case that water for cleaning is sterilized water by electrolysis, according to an embodiment.
Figure 11:
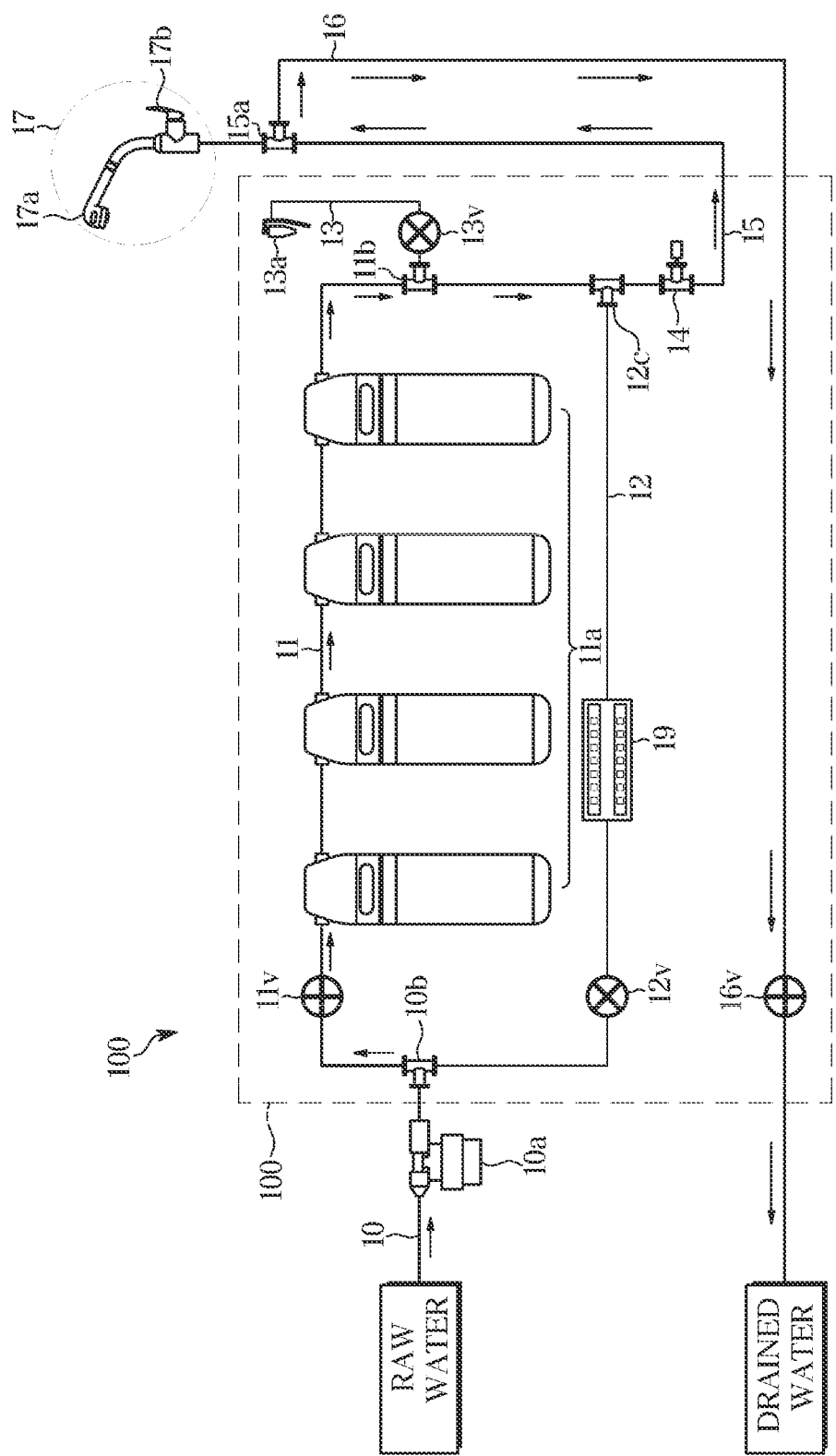
FIG. 11 is a diagram for describing a rinsing course in a case that water for cleaning is sterilized water which is sterilized by ultraviolet rays, according to an embodiment.

FIG. 10 is a diagram for describing a rinsing course in a case that water for cleaning is sterilized water by electrolysis, and FIG. 11 is a diagram for describing a rinsing course in a case that water for cleaning is sterilized water which is sterilized by ultraviolet rays.

Referring to FIG. 6, the flow sensor 14 may detect an amount of a fluid flowing in the cooking water supply tube 15, and the controller 20 may determine whether a value of the flow amount detected by the flow sensor 14 for a preset period of time is equal to or less than a preset value, in 2000.

When the value of the flow amount detected by the flow sensor 14 for the preset period of time is equal to or less than the preset value in 2000, the controller 20 may provide raw water having passed the wash water flow path 12 to the cooking water supply tube 15 in 2100, by closing the first valve 11v and the purified water valve 13v and opening the second valve 12v and the drainage valve 16v.

Referring to FIG. 7, in a case that the first valve 11v and the purified water valve 13v are closed and the second valve 12v and the drainage valve 16v are opened, it may be seen that raw water that has passed the raw water flow path 10 passes the joint 10b, passes the joint 12c through the wash water flow path 12, and is provided to the cooking water supply tube 15.

Furthermore, as the drainage valve 16v is opened, it may be seen that the raw water provided to the cooking water supply tube 15 washes the cooking water supply tube 15 and is drained to the outside through the drainage flow path 16.

According to the embodiment, as the cooking water supply tube 15 is washed with the raw water, a reduction in lifespan of the water purification filter from frequent washing courses may be prevented. Furthermore, with various sterilizers 18 and 19 equipped in the wash water flow path 12, the cooking water supply tube 15 may be washed with sterilized raw water.

For example, the wash water flow path 12 may include the electrolyser 18 as shown in FIG. 8, and the ultraviolet lamp 19 as shown in FIG. 9.

In this case, the controller 20 may operate the electrolyser 18 and/or the ultraviolet lamp 19 to sterilize raw water flowing in the wash water flow path 12, in 2200.

Specifically, referring to FIG. 8, in a case that the first valve 11v and the purified water valve 13v are closed, the second valve 12v and the drainage valve 16v are opened, and the electrolyser 18 is operated, it may be seen that raw water that has passed the raw water flow path 10 passes the joint 10b and is electrolyzed by the electrolyser 18 when passing the wash water flow path 12.

In this case, the sterilized water by electrolysis may pass the joint 12c and be provided to the cooking water supply tube 15, and as the drainage valve 16v is opened, the sterilized water provided to the cooking water supply tube 15 washes the cooking water supply tube 15 and then be drained to the outside through the drainage flow path 16.

Similarly, referring to FIG. 9, in a case that the first valve 11v and the purified water valve 13v are closed, the second valve 12v and the drainage valve 16v are opened, and the ultraviolet lamp 19 is operated, it may be seen that raw water that has passed the raw water flow path 10 passes the joint 10b and is sterilized by ultraviolet rays when passing the wash water flow path 12.

In this case, the sterilized water sterilized by ultraviolet rays may pass the joint 12c and be provided to the cooking water supply tube 15, and as the drainage valve 16v is opened, the sterilized water provided to the cooking water supply tube 15 washes the cooking water supply tube 15 and then be drained to the outside through the drainage flow path 16.

According to the embodiment, the sterilized water produced by the electrolyser 18 or the ultraviolet lamp 19 may wash the cooking water supply tube 15, thereby efficiently getting rid of microorganisms that inhabit the cooking water supply tube 15.

The controller 20 may determine whether a value of a flow amount detected by the flow sensor 14 is equal to or greater than a threshold in 2300, after closing the first valve 11v and the purified water valve 13v and opening the second valve 12v and the drainage valve 16v.

Unlike the case that the water for cleaning is purified water, the controller 20 may start a rinsing course by opening the first valve 11v and closing the second valve 12v in operation 2400, when the value of the flow amount detected by the flow sensor 14 is equal to or greater than the threshold in 2300. In this case, the controller 20 may stop operating the electrolyser 18 and/or the ultraviolet lamp 19.

Referring to FIGS. 9 and 10, as the first valve 11v is opened and the second valve 12v is closed, it may be seen that the wash water that has passed the wash water flow path 12 is no longer provided to the cooking water supply tube 15 but purified water that has passed the water purification path 11 is provided.

Specifically, raw water that has passed the raw water flow path 10 due to closing of the second valve 12v may not flow to the wash water flow path 12 through the joint 10b, and raw water that has passed the raw water flow path 10 due to opening of the first valve 11v may flow to the water purification path 11 through the joint 10b.

The raw water filtered while passing the water purification path 11 may be provided to the cooking water supply tube 15 through the joint 12c afterward, and the purified water provided to the cooking water supply tube 15 may wash the cooking water supply tube 15 and then be drained to the outside through the drainage flow path 16.

When the value of the flow amount detected by the flow sensor 14 is equal to or greater than the threshold in 2500 since the start of the rinsing course by opening the first valve 11v and closing the second valve 12v, the controller 20 may finish the rinsing course by closing the drainage valve 16v in 2600.

According to the embodiment, a problem that the raw water or sterilized water remaining in the cooking water supply tube 15 is discharged when the user operates the cooking water lever 17b after the washing course may be solved by draining the raw water or sterilized water remaining in the cooking water supply tube 15 along with the purified water after the washing course.

Although not shown, the water purifier 100 according to an embodiment may include a function of cleaning hot water that remains in the cooking water supply tube 15 after the user uses the hot water for water for cooking.

Specifically, after a preset time has elapsed since the input module equipped in the water purifier main body 110 received a command to use the hot water as the water for cooking from the user and the cooking water lever 17b was operated, the controller 20 may wash the cooking water supply tube 15 through the aforementioned washing course.

In other words, when a signal indicating that the hot water is used as water for cooking is received and a value of a flow amount has not been detected for a preset period of time after detection of a value of a flow amount from the flow sensor 14, the cooking water supply tube 15 may be washed with purified water, raw water, or sterilized water through the aforementioned washing course.

In this case, the preset period of time may be set to be shorter than the aforementioned preset period of time. It is because hot water provides a good microorganism-inhabitable environment.

Meanwhile, the embodiments of the disclosure may be implemented in the form of a storage medium for storing instructions to be carried out by a computer. The instructions may be stored in the form of program codes, and when executed by a processor, may generate program modules to perform operation in the embodiments of the disclosure. The storage media may correspond to computer-readable storage media.

The machine-readable storage medium may be provided in the form of a non-transitory storage medium. The term 'non-transitory storage medium' may mean a tangible device without including a signal, e.g., electromagnetic waves, and may not distinguish between storing data in the storage medium semi-permanently and temporarily. For example, the non-transitory storage medium may include a buffer that temporarily stores data.

In an embodiment of the disclosure, the aforementioned method according to the various embodiments of the disclosure may be provided in a computer program product. The computer program product may be a commercial product that may be traded between a seller and a buyer. The computer program product may be distributed in the form of a storage medium (e.g., a compact disc read only memory (CD-ROM)), through an application store (e.g., play store™), directly between two user devices (e.g., smart phones), or online (e.g., downloaded or uploaded). In the case of online distribution, at least part of the computer program product (e.g., a downloadable app) may be at least temporarily stored or arbitrarily created in a storage medium that may be readable to a device such as a server of the manufacturer, a server of the application store, or a relay server.

The embodiments of the disclosure have thus far been described with reference to accompanying drawings. It will be obvious to people of ordinary skill in the art that the present disclosure may be practiced in other forms than the embodiments as described above without changing the technical idea or essential features of the present disclosure. The above embodiments are only by way of example, and should not be interpreted in a limited sense.

What is claimed is:

1. A water purifier comprising:
    a raw water flow path formed to allow raw water to flow from outside;
    a first valve arranged in a water purification path connected to the raw water flow path such that the raw water from the outside passes through a water purifying filter, and opening or closing the water purification path;
    a second valve arranged in a wash water flow path connected to the raw water flow path such that the raw water from the outside flows without passing through the water purifying filter, and opening or closing the wash water flow path;
    a purified water valve arranged in a purified water supply tube connected to the water purification path such that purified water having passed through the water purification path is supplied to a water purifier outlet nozzle, and opening or closing the purified water supply tube;
    a flow sensor arranged in a cooking water supply tube connected to the water purification path and the wash water flow path such that the purified water having passed through the water purification path or wash water having passed through the wash water flow path is supplied to a cooking water outlet nozzle, and sensing an amount of fluid flowing in the cooking water supply tube;
    a drainage valve arranged in a drainage flow path branched from the cooking water supply tube such that a stagnant fluid in the cooking water supply tube is drained to the outside, and opening or closing the drainage flow path; and
    a controller configured to drain the stagnant fluid in the cooking water supply tube to the outside through the drainage flow path by controlling opening or closing of the purified water valve, the first valve, the second valve, and the drainage valve based on a value of the flow amount sensed by the flow sensor for a preset period of time being equal to or less than a preset value.

2. The water purifier of claim 1, wherein the controller is configured to provide purified water having passed the water purification path to the cooking water supply tube by closing the second valve and the purified water valve and opening the first valve and the drainage valve.

3. The water purifier of claim 1, wherein the controller is configured to provide wash water having passed the wash water flow path to the cooking water supply tube by closing the first valve and the purified water valve and opening the second valve and the drainage valve.

4. The water purifier of claim 3, further comprising: an electrolyser arranged in the wash water flow path for electrolyzing raw water flowing in the wash water flow path,
wherein the controller is configured to electrolyze the raw water flowing in the wash water flow path by operating the electrolyser.

5. The water purifier of claim 3, further comprising: an ultraviolet lamp arranged in the wash water flow path for sterilizing the raw water flowing in the wash water flow path,
wherein the controller is configured to sterilize the raw water flowing in the wash water flow path by operating the ultraviolet lamp.

6. The water purifier of claim 2, wherein the controller is configured to close the drainage valve based on a flow amount value detected by the flow sensor being equal to or greater than a threshold after closing the second valve and the purified water valve and opening the first valve and the drainage valve.

7. The water purifier of claim 3, wherein the controller is configured to provide purified water having passed the water purification path to the cooking water supply tube by opening the first valve and closing the second valve based on a flow amount value sensed by the flow sensor being equal to or greater than a threshold after closing the first valve and the purified water valve and opening the second valve and the drainage valve.

8. The water purifier of claim 7, wherein the controller is configured to close the drainage valve based on a flow amount value sensed by the flow sensor being equal to or greater than the threshold after opening the first valve and closing the second valve.

9. The water purifier of claim 6, wherein the threshold is set to be proportional to a volume of the cooking water supply tube.

10. The water purifier of claim 1, wherein the cooking water supply tube has length longer than a length of the purified water supply tube.

11. A method of controlling a water purifier including a raw water flow path formed to bring in raw water from outside, a first valve arranged in a water purification path connected to the raw water flow path such that the raw water passes through a water purifying filter, and opening or closing the water purification path, a second valve arranged in a wash water flow path connected to the raw water flow path such that the raw water flows without passing through the water purifying filter, and opening or closing the wash water flow path, a purified water valve arranged in a purified water supply tube connected to the water purification path such that purified water having passed through the water purification path is supplied to a water purifier outlet nozzle, and opening or closing the purified water supply tube, a flow sensor arranged in a cooking water supply tube connected to the water purification path and the wash water flow path such that the purified water having passed through the water purification path or wash water having passed through the wash water flow path is supplied to a cooking water outlet nozzle, and sensing an amount of fluid flowing in the cooking water supply tube, and a drainage valve arranged in a drainage flow path branched from the cooking water supply tube such that a stagnant fluid in the cooking water supply tube is drained to the outside, and opening or closing the drainage flow path, the method comprises
determining whether a flow amount value sensed by the flow sensor for a preset period of time is equal to or less than a preset value; and
draining a stagnant fluid in the cooking water supply tube to the outside through the drainage flow path by controlling opening or closing of the purified water valve, the first valve, the second valve, and the drainage valve based on the flow amount value sensed by the flow sensor for the preset period of time being equal to or less than the preset value.

12. The method of controlling a water purifier as in claim 11, wherein the draining of the stagnant fluid in the cooking water supply tube to the outside through the drainage flow path by controlling opening or closing of the purified water valve, the first valve, the second valve, and the drainage valve comprises
providing purified water having passed the water purification path to the cooking water supply tube by closing the second valve and the purified water valve and opening the first valve and the drainage valve.

13. The method of controlling a water purifier as in claim 11, wherein the draining of the stagnant fluid in the cooking water supply tube to the outside through the drainage flow path by controlling opening or closing of the purified water valve, the first valve, the second valve, and the drainage valve comprises
providing wash water having passed the wash water flow path to the cooking water supply tube by closing the first valve and the purified water valve and opening the second valve and the drainage valve.

14. The method of controlling a water purifier as in claim 13, further comprising: an electrolyser arranged in the wash water flow path for electrolyzing raw water flowing in the wash water flow path,
wherein the providing wash water having passed the wash water flow path to the cooking water supply tube by closing the first valve and the purified water valve and opening the second valve and the drainage valve comprises
electrolyzing the raw water flowing in the wash water flow path by operating the electrolyser; and
providing electrolyzed raw water to the cooking water supply tube.

15. The method of controlling a water purifier as in claim 13, further comprising: an ultraviolet lamp arranged in the wash water flow path for sterilizing the raw water flowing in the wash water flow path,
wherein the providing of the wash water having passed the wash water flow path to the cooking water supply tube by closing the first valve and the purified water valve and opening the second valve and the drainage valve comprises
operating the ultraviolet lamp to sterilize the raw water flowing in the wash water flow path; and providing sterilized raw water to the cooking water supply tube.

* * * * *